US012671854B2

(12) United States Patent
Kulkarni et al.

(10) Patent No.: US 12,671,854 B2
(45) Date of Patent: Jun. 30, 2026

(54) SYSTEM AND METHOD FOR IMPROVING MEDIA PLAYBACK RESPONSE TIME IN CONTACT CENTERS

(71) Applicant: NICE LTD., Ra'anana (IL)

(72) Inventors: Archana Kulkarni, Pune (IN); Onkar Hingne, Bhopal (IN); Sourav Chauhan, New Delhi (IN)

(73) Assignee: NICE LTD., Ra'anana (IL)

( * ) Notice: Subject to any disclaimer, the term of this patent is extended or adjusted under 35 U.S.C. 154(b) by 36 days.

(21) Appl. No.: 18/171,499

(22) Filed: Feb. 20, 2023

(65) Prior Publication Data

US 2024/0283989 A1     Aug. 22, 2024

(51) Int. Cl.
*H04N 21/278* (2011.01)
*H04N 21/235* (2011.01)

(52) U.S. Cl.
CPC ....... *H04N 21/2353* (2013.01); *H04N 21/278* (2013.01)

(58) Field of Classification Search
None
See application file for complete search history.

(56) References Cited

U.S. PATENT DOCUMENTS

| | | | |
|---|---|---|---|
| 2018/0189226 A1* | 7/2018 | Hofverberg | G06N 5/02 |
| 2019/0342419 A1* | 11/2019 | Bromand | H04N 21/41422 |
| 2021/0021905 A1* | 1/2021 | Li | H04N 21/222 |
| 2022/0012281 A1 | 1/2022 | Katz et al. | |
| 2022/0230094 A1* | 7/2022 | Panitsas | G06F 11/3447 |
| 2023/0188775 A1* | 6/2023 | Topiwalla | H04N 21/278 725/109 |
| 2023/0237277 A1* | 7/2023 | Reza | G06F 40/186 704/9 |
| 2023/0362420 A1* | 11/2023 | Mang | H04N 21/2402 |
| 2024/0137424 A1* | 4/2024 | Chung | H04L 41/122 |

* cited by examiner

*Primary Examiner* — Benjamin R Bruckart
*Assistant Examiner* — Charles N Hicks

(57) ABSTRACT

A system and method are provided to predict media playback requests of media files to decrease response times to the media playback requests. The system includes a processor and a computer readable medium operably coupled thereto, to perform predictive caching operations which include receiving metadata from an interaction stream after recording a media file of an interaction, determining contacts corresponding to users identified in the metadata that are recorded in the media file from the metadata, accessing an ML model for predictive caching of media files, determining, using the ML model and a plurality of model features for the ML model, a first prediction for a first playback of the media file, predicting the first playback of the media file by at least one of the contacts based on the first prediction, caching the media file in the data cache for a time period based on the predicting.

18 Claims, 7 Drawing Sheets

100

Intelligent Playback Service 120

Predictive Playback Application 130

Incoming Interactions 132

Data Streams 134

AI Models 136

Playback Requests 138

CRM Applications 122

Database 124

Media Files 126

Metadata 127

Network Interface Component 128

Network 140

Client Device 110

Application 112

Playback Request 114

Database 116

Network Interface Component 118

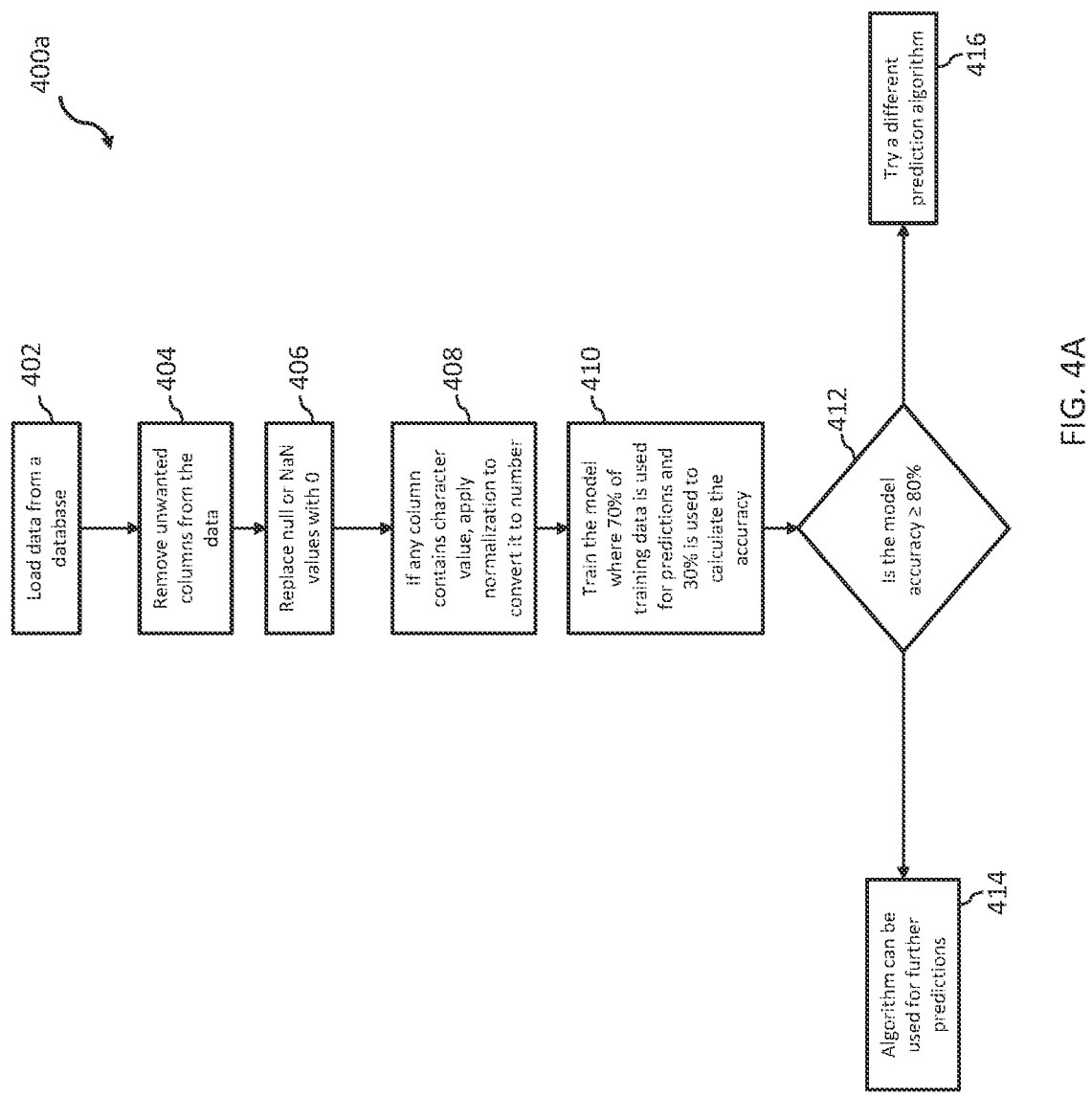

400a

402 Load data from a database

404 Remove unwanted columns from the data

406 Replace null or NaN values with 0

408 If any column contains character value, apply normalization to convert it to number 410 Train the model where 70% of training data is used for predictions and 30% is used to calculate the accuracy 412 Is the model accuracy ≥ 80%

414 Algorithm can be used for further predictions

416 Try a different prediction algorithm

FIG. 4A

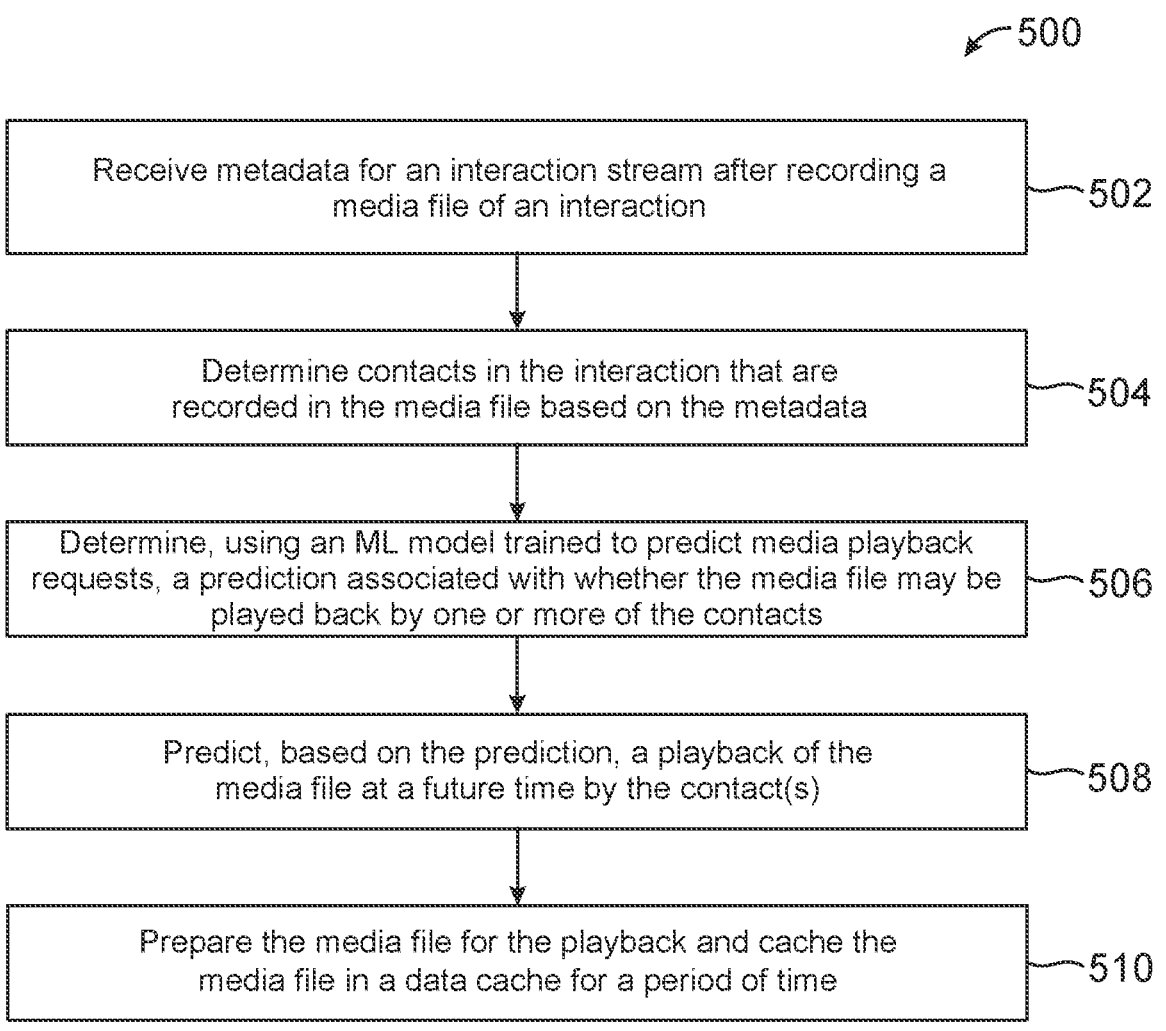

500

Receive metadata for an interaction stream after recording a
media file of an interaction — 502

Determine contacts in the interaction that are
recorded in the media file based on the metadata — 504

Determine, using an ML model trained to predict media playback
requests, a prediction associated with whether the media file may be
played back by one or more of the contacts — 506

Predict, based on the prediction, a playback of the
media file at a future time by the contact(s) — 508

Prepare the media file for the playback and cache the
media file in a data cache for a period of time — 510

FIG. 5

SYSTEM AND METHOD FOR IMPROVING MEDIA PLAYBACK RESPONSE TIME IN CONTACT CENTERS

COPYRIGHT NOTICE

TECHNICAL FIELD

The present disclosure relates generally to artificial intelligence (AI) and machine learning (ML) systems and models associated with media file playback, and more specifically to a system and method for an ML or other AI system trained to intelligently prepare and cache media files based on predicting or forecasting whether the media files may be played back.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

Contact centers often record and store agents' computer screen activity and/or voice interactions with customers so that the recorded interactions can be retrieved and played back for different purposes. For example, agents, which may correspond to call center employees or other representatives, and other users for a company and/or corresponding call center may respond to calls from customers, clients, and other users for requests, questions, and/or other communications during voice and/or video calls. Recordings of agent interactions may be used for resolving a dispute with a customer regarding a transaction performed during the session or for monitoring the quality and performance of service representatives. Thus, during use of different work systems, such as customer relationship management (CRM) systems, organizational operations systems, information systems, and the like, media files and other media data may be recorded of particular interactions between two or more entities. These entities may correspond to individual users or groups of users, as well as automated systems including chatbots, interactive voice response (IVR) systems, and the like. After interactions, the media files recording these interactions may therefore be played back. This requires processing of media files for playback, such as to generate a final playable media file in a specific format from different data and/or recordings (e.g., audio, video, screen, etc., recordings, which also me be subdivided based on pauses, transfers, and the like).

Runtime processing of media files may include authorization of users and/or contacts on an interaction stream or other communication, downloading of media files, stitching media files and other data in order, adding silences/blanks as needed in the media files, and uploading the playable final media files for distribution, which impacts the overall user experience by taking considerable time and processing resources. After an interaction and recording of the interaction, media files and recordings may also be compressed to save storage space in a database system or data warehouse. When an interaction is played back, the associated recorded media files are required to be processed, decompressed, and the like so that each can be converted into playable format and accessed via a web media player (e.g., HTML5 video player). As such, when the media data is later retrieved for playback, the corresponding recorded media file will be capable of being played back without decoding and/or transcoding the data for a media player. However, when done in real-time and/or at a time of a media playback request, this decoding, transcoding, and/or other preparation of a phone call may also take a significant amount of time. Additionally, with a standard web player, such as an HTML5 video player utilized for website video playback, a compressed media file may not be playable.

This necessary processing of media files to prepare a final playable MP4 or other media file may take a significant amount of time and computer processing and the prepared media file may only be available for playback once the necessary computation and processing is complete. Thus, there may be significant time delay between when a media playback request is received until playback of a media file, especially when the media file is large (e.g., for long duration interactions, video conferences, and the like). However, agents, customers, and/or clients may not want to wait for their playback to start, and waiting times may also lead to significant productivity losses. Due to different compliance and retention requirements, audio and screen recordings cannot be merged and kept ready for playback beforehand, thereby requiring specific processing and/or loading steps to be performed when requested. Thus, there is a need to improve the playback performance and decrease playback response times to avoid unnecessary media processing time. It therefore is desirable to predict which media files may be played back for precaching prior to playback without overly taxing computing systems and resources for interaction recording, media file preparation, and data storage.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

FIGS. 4A-4B are simplified diagrams of exemplary flow-charts for training and deploying ML models for predictive playback services of media files according to some embodiments.

FIG. 5 is a simplified diagram of an exemplary flowchart for improving media playback response time in call centers using ML models trained to predict media playback requests according to some embodiments.

DETAILED DESCRIPTION OF PREFERRED EMBODIMENTS

Figure 1:
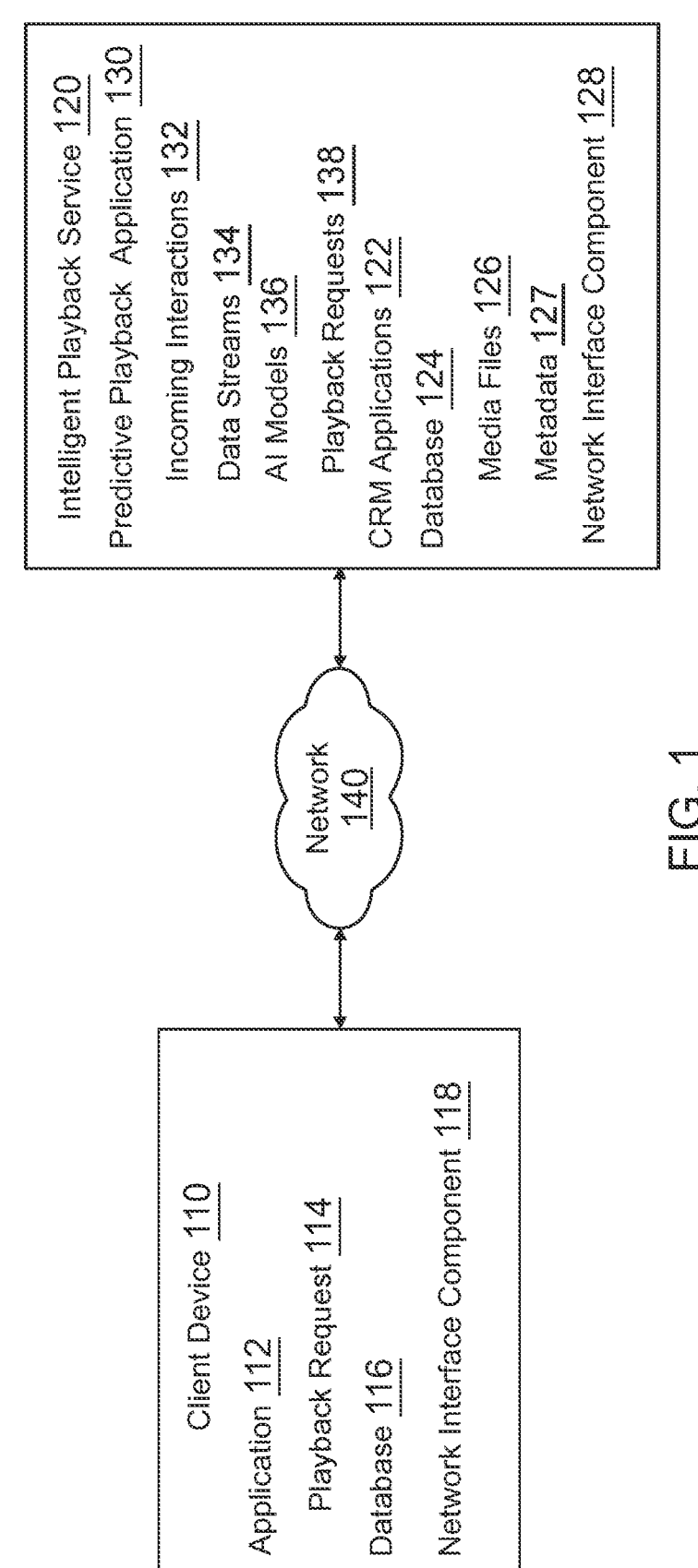
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For an artificial intelligence (AI) system for intelligent media file playback preparation and caching, methods, data structures, and systems are provided for training and utilizing an ML model or other AI system (e.g., neural networks (NNs), rule-based AI engines, etc.) to predict whether one or more users may request playback of a media file for a recorded interaction between two or more users (e.g., contacts, with may include customers, agents, representatives, employees, vendors, third-parties, and the like). A service provider, such as a CRM system, customer service system, business management system, organizational management system, or other networked service provider, may record media content, files, and data (e.g., audio, visual, and/or audiovisual content) of interactions between different users and/or entities. This may include phone calls, video conferencing, audio/video streaming services, and the like. For example, different internal and/or external users of a service provider may interact over end-to-end communications that may be recorded by the service provider for later review and use. When a media file is played back, the media file and/or data for the media file is/are required to be transcoded and prepared, as well as decoded and decompressed in some embodiments, into a playable format for media players, which consumes time and computing resources. This introduces a time delay and significant time delays may result where a media file is large.

For example, tenant entities and other customers may include and/or utilize agents, such as those associated with call centers, or other representatives that communicate with internal and/or external users. The agents may communicate through a stream, connection, or other data exchange of audio and/or video content and data. A media storage and playback system may record the interaction for later playback. This data and metadata may be recorded and stored in one or more databases, repositories, cloud computing systems and environments, and the like. A media file may be associated with a set of metadata describing the media file and underlying data. For example, media files may be associated with different parameters, including participants to the recording (e.g., endpoints and/or users on a phone call), a group identification associated with the media file and/or requester of the media file (e.g., an identifier of particular division or sub-division within an organization), a start time and/or duration of the recording, a screen resolution for recorded video, and the like. The metadata for the media files may also include an identifier of different contacts or other users involved in the interaction (e.g., a globally unique identifier (GUID) or universally unique identifier (UUID)), a time of the interaction and/or requested playback, and the like file.

However, the activities involved in preparation of playable media file from recorded files (audio/video/screen) may involve downloading, stitching parts of the media file together for a playable media file, and uploading of such file. These operations may only be improved to a certain level without incurring a large compute cost (e.g., consuming too much or too costly an amount of processing and network resources), especially at a high request rate for media playbacks (e.g., more than 60 per second). The cost and time required for preparing media files that are large may be even more costly and time consuming, such as where recordings are long and content heavy.

As such, a technical solution to this problem may be to more intelligently predict the need for a media file playback before a request for the playback, e.g., by analyzing the historical audit data of playback patterns using ML algorithms, techniques, models, and engines. In order to provide for predictive caching of media files and other media data, in some embodiments an ML or NN model may be trained and generated. ML models may be built on different tenants. Using the automated machine predictions (e.g., without manual intervention and/or efforts), the playback system may then preprocess the required computation for media processing and preparation of the media file. The final and preprocessed media file may be stored to a data cache before being played back by the requesting contact or other user (e.g., a manager, administrator, etc.). Preprocessing of media may assist in reducing the response time and allowing users to playback an interaction in less time and with a faster response rate or time to the request. It can also minimize peak computing load requirements for a given system. This may assist in adhering to a service level agreement (SLA) of playback response time(s) which eventually improves the customer experience.

Since it may be costly to preprocess each and every interaction and keep a playable media file (e.g., MP4) ready for each call, not every call may be predicted for playback, and particularly, not at the same time. For example, a small percentage (30-40%) of interactions may actually be played back. This may be determined from playback audit data and used to configure ML models and/or thresholds for decision-making, ML output decisions, and the like. Exemplary playback audit data may indicate that 80% of customers (e.g., tenants, agents, etc.) playback less than 10% of their interactions, 10% of the customers playback between roughly 30-60% of their interactions, and 2% customers extract 70-100% of their calls and around 1% of the customers extract more than 100% i.e., those customers do repeated playbacks on the same calls. Thus, preprocessing each interaction may incur a large computing cost and resource consumption.

Therefore, an ML model and system may assist in analyzing playback patterns and accordingly predict the possibility of playback of an interaction and request for a media file so that preprocessing may be performed on predicted media files, which allows corresponding users, contacts, or customers to be able to playback those predicted media files in less time. The ML model may be trained to predict possibility of playback and allow preprocessing of the media files for a playable media file in advance. This allows for selective preprocessing and caching of the media file in a data cache, which may be served, loaded, played, and/or transmitted in a faster and more efficient manner. The ML model and features may be based on contacts and their historical playback audit data, as well as audit data of other playbacks and/or media file uses, to effectively predict if an interaction and corresponding media file may be played back.

The embodiments described herein provide methods, computer program products, and computer database systems for algorithmic predictive playback model training, configuration, deployment, and execution in production computing environments. The service provider system associated with or incorporating ML and other AI systems described herein may therefore prepare and cache media files of contacts' or other users' interactions prior to playback requests, thereby reducing preparation and processing times. For example, the online system may provide a link, communication, application interface, web or online portal, or the like that may be used to access and playback a media file that has been predictively prepared and stored to a local and faster response time memory cache. This allows for faster, more efficient, and more coordinated media file playback while reduce system processing costs, processing loads, and resource usage for such features.

According to some embodiments, in a service provider computing system accessible by a plurality of separate and distinct organizations, an ML or other AI model and system is provided for predicting, preparing, and caching media files of interactions between contacts prior to predicted playback requests, thereby optimizing media file playback response times, reducing data processing loads and resource costs, and providing more efficient media file playbacks.

Example Environment

The system and methods of the present disclosure can include, incorporate, or operate in conjunction with or in the environment of a media playback service, system, database, and portal, which may include web and device applications used for playback of media content and files. Such systems may include or be associated with systems for live and/or recorded user interactions, such as interactions between contacts during audio, video, and/or other audiovisual communications. FIG. 1 is a block diagram of a networked environment suitable for implementing the processes described herein according to an embodiment. As shown, an environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. One or more devices and/or servers may be operated and/or maintained by the same or different entities.

FIG. 1 illustrates a block diagram of an example environment 100 according to some embodiments. Environment 100 may include a client device 110 and an intelligent playback service 120 that interact to provide preparation and caching of media files of interactions between contacts prior to predicted playbacks of such interactions. In other embodiments, environment 100 may not have all of the components listed and/or may have other elements instead of, or in addition to, those listed above. In some embodiments, the environment 100 is an environment in which preparing and caching of media files for playback is performed in a predictive manner for potential playback by contacts or other users and entities. Client device 110 may be any machine or system that is used by a user to request playback of a media file recording an interaction between two or more contacts including humans or machine/automated endpoints. In further embodiments, client device 110 may be used during such interactions, however, client device 110 may also be used by one of the contacts in the interaction or a separate user that reviews the interaction via playback of the corresponding media file. Client device 110 can be a handheld computing device, a mobile phone, a laptop computer, a notepad computer, a workstation, and/or a network of computing devices. As illustrated in FIG. 1, client device 110 might interact via a network 140 with intelligent playback service 120, which predicts playback requests of media files and prepares the media files to cache for a period of time for the potential playback(s).

Client device 110 may be utilized in order to identify a phone call, video conference, audio/video/audiovisual chat or communication, or other interaction through an application 112. This may be done through identifiers, data, metadata, or the like of the interaction, contacts to the interaction, or the like. Client device 110 may transmit, provide, and/or submit a playback request 114 of one or more media files from intelligent playback service 120 and/or another database system associated with intelligent playback service 120 for the interaction. For example, client device 110 and/or other client devices, servers, or online platforms may request playback of cached and/or stored media files via playback request 114 and/or provide another query for media files. In this regard, application 112 of client device 110 may identify one or more of media files 126 stored to a data cache or other short-term and quick-access data storage of or associated with database 124 via a predictive playback application 130 of intelligent playback service 120. Predictive playback application 130 may access, retrieve, load, link to, and/or otherwise provide the requested media file of media files 126 to client device 110 through application 112. As described herein, the media file may have been predictively prepared and cached by predictive playback application 130.

For example, incoming interactions 132 may correspond to voice, image, video, and/or other media content that may be generated between one or more interactions between contacts, such as disparate users over a communication session, link, or exchange. In some embodiments, one or more of incoming interactions 132 that may be identified for playback may have been performed by client device 110 and/or another device, server, or system that interacts with intelligent playback service 120. These may be generated based on use of one or more of CRM applications 122, such as one or more call center applications that an agent of a company or other organization may use to converse with customers and other users. However, CRM applications 122, in some embodiments, may not be required to be provided by intelligent playback service 120 and/or may be provided by another online platform, service, or system that may be internally or externally connected and/or associated with intelligent playback service 120. Further, other types of communication applications and system may similarly provide services for contacts to interact.

Data for incoming interactions 132 may be streamed and recorded as data streams 134, which may be used to generate and/or store media files 126 having metadata 127. In some embodiments, incoming data and metadata from data streams 134 may be stored and/or archived directly without processing into media files 126 and/or may be queued, such as in a processing queue and log, for processing and preparation into one or more of media files 126. Thus, media files 126 may correspond to formatted, processed, and prepared data files having media content, such as audio, images, video, and/or metadata 127. In some embodiments, media files 126 may correspond to MP4, MOV, WMV, AVI, WEBM or HTML5, or similar digital audio and/or video formats. Metadata 127 may correspond to one or more tables of descriptive and identifying data associated with media files 126, including data associated with recording and creating media files 126, storing media files 126, and/or playing media files 126. For example, each of media files 126 may include or be associated with metadata including data variables, characteristics, and other data specifications (e.g., data input, files, or other data structures).

Predictive playback application 130 may train AI models 136 using training data for predictive playback services of media files 126. Training data may correspond to past playbacks of media files, audit data from past media files and their playbacks, customer playback requests and/or data, contact data for contacts of past interactions, and the like. Training of AI models 136 may be performed to generate one or more predictive models that may output a prediction, score, classification, or recommendation of whether media files 126 of incoming interactions 132 may be played back after recording, and therefore should be prepared and cached or stored in a quick-access storage for faster retrieval and delivery when requested.

Training of AI models 136 may include ML model training, NN training, AI rule-based engine generation or configuration, and/or the like. For example, ML and/or NN training may be performed as described herein, including use of tree-based algorithms, clustering algorithm, deep neural network (DNN) algorithms, and the like. AI models 136 may include trained models using supervised and/or unsupervised algorithms and/or data sets, including annotated and/or unannotated data based on data records for a corresponding training data set. Further, AI models 136 may be continuously, recursively, and/or periodically retrained, such as by using feedback data and/or a feedback loop, using additional training data (e.g., more current or new data records, annotation, and the like).

Once one or more of AI models 136 are trained, the model(s) (such as an ML model trained for playback prediction of media files) may be deployed with predictive playback application 130. AI models 136 may be used to take, as input at an input layer, data and/or metadata asso-ciated with an incoming interaction and/or data stream from incoming interactions 132 and/or data streams 134, respectively, and predict whether the data should be predictively prepared and preprocessed to be stored and/or precached as one or more of media files 126 with metadata 127. Such predictions may be based on a set of input features for an output score, classification, or prediction at an output layer and based on computations and/or calculations from mathematical processes and/or operations performed via hidden layers and/or nodes in hidden layers, which may be connected. In other embodiments, other operations may be performed, such as clustering calculations, deep learning calculations, neuron activations, and the like, for different AI models. AI models 136 may therefore be used to predict playback requests 138 and have one or more of media files 126 prepared prior to receipt of playback requests 138 by predictive playback application 130 for faster retrieval, response, and/or loading times. This allows for more efficient provision of media files 126 in a faster manner while limiting overuse and/or waste of computing resources and minimizing peak computing requirements. Training and use of AI models 136 for predictive playback computing services within computing systems and architectures are described further with regard to FIGS. 2-5 herein.

In response to playback requests 138, such as playback request 114 from client device 110, one or more of media files 126 may be retrieved and/or provided. Provision may be through a communication having the corresponding one of media files 126, a link to a digital location or address where the media file may be found or is hosted, or the like. Thereafter, a user of client device 110 may utilize application 112 to perform playback of the preprocessed media file in order to provide playback in a faster and more responsive manner. The media file may be played through application 112, such as an HTML5 video player used within a webpage and web browser, a Flash media player, media player applications (e.g., Windows Media Player, VLC media player, etc.), or the like. The prepared media file may be stored locally to a database 116 of client device 110 and/or streamed directly via the media player of application 112. In some embodiments, the users of client device 110 may differ in their respective capacities, and the capacity of a particular client device 110 might be determined by applications, permissions, and profiles for the current user. Thus, different users will have different capabilities and perform different events with regard to accessing, requesting, and playing media files 126, for example, by different access levels to media files 126 for playback. However, this is not mandatory, and it is understood that client device 110 may generally have certain capacities that are universal to users, entities, or other clients (thereby not specific to operations submitted for processing by intelligent playback service 120).

Client device 110 may execute a web-based client that accesses a web-based application for intelligent playback service 120, or may utilize a rich client, such as a dedicated resident application, to access intelligent playback service 120. Client device 110 may utilize one or more application programming interfaces (APIs) to access and interface with intelligent playback service 120 and interact with CRM applications 122 and/or predictive playback application 130. Thus, application 112 can be used to access data and applications hosted by intelligent playback service 120 and to perform searches on stored data, for example, through providing a user interface to a user (e.g., a graphical user interface (GUI) or other user interface output) or via an API of application 112. Interfacing with intelligent playback service 120 may be provided through application 112 and may include data stored to database 116. Intelligent playback service 120 may process and provide data through CRM applications 122 and/or predictive playback application 130, for example, using AI models 136 to respond to playback request 114 with one or more of media files 126 cached and/or stored in local and/or quick-access storage based on predictions of playbacks of those media files. Database 124 of intelligent playback service 120 may store data associated with media files 126, including metadata 127 and metadata tables for media files 126.

Client device 110 might communicate with intelligent playback service 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between client device 110 and intelligent playback service 120 may occur over network 140 using a network interface component 118 of client device 110 and a network interface component 128 of intelligent playback service 120. In an example where HTTP/HTTPS is used, client device 110 might include an HTTP/HTTPS client commonly referred to as a "browser" for sending and receiving HTTP//HTTPS messages to and from an HTTP//HTTPS server, such as intelligent playback service 120 via network interface component 118. Similarly, intelligent playback service 120 may host an online platform accessible over network 140 that communicates information to and receives information from client device 110 via network interface component 128. Such an HTTP/HTTPS server might be implemented as the sole network interface between client device 110 and intelligent playback service 120, but other techniques might be used as well or instead. In some implementations, the interface between client device 110 and intelligent playback service 120 includes load sharing functionality. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Client device 110 may utilize network 140 to communicate with intelligent playback service 120, which may be any network or combination of networks of devices that communicate with one another. For example, network 140 may be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, intelligent playback service 120 is configured to provide webpages, forms, applications, data, and media content to client device 110 and/or to receive data from client device 110. In some embodiments, intelligent playback service 120 may be provided or implemented in a server environment and/or cloud environment, which may be accessible through one or more APIs with or without a correspond GUI output. Intelligent playback service 120 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, client device 110 and intelligent playback service 120, shown in FIG. 1, execute processing logic with processing components to provide data used for application 112, CRM applications 122, and/or predictive playback application 130. In one embodiment, intelligent playback service 120 includes application servers configured to implement and execute software applications, as well as provide related data, code, forms, webpages, platform components or restrictions, and other information associated with predictive playback services of media files that a preprocessed and precached based on predictions of playbacks. Intelligent playback service 120 may implement various functions of processing logic and processing components, and the processing space for executing system processes, such as running applications for ML modeling and training for prediction of potential playbacks of media files recording interactions, as well as implement and utilize such ML models. Thus, intelligent playback service 120 may send and receive data via a network interface component 128. In some embodiments, intelligent playback service 120 may be provided by one or more cloud processing platforms, such as Amazon Web Services® (AWS) Cloud Computing Services, Google Cloud Platform®, Microsoft Azure® Cloud Platform, and the like, or may correspond to computing infrastructure of an entity, such as a financial institution or call center.

Several elements in the system shown in FIG. 1 include elements that are explained briefly here. For example, client device 110 could include a desktop personal computer, workstation, laptop, notepad computer, PDA, cell phone, or any wireless access protocol (WAP) enabled device or any other computing device capable of interfacing directly or indirectly to the Internet or other network connection. Client device 110 may also be a server or other online processing entity that provides functionalities and processing to other client devices or programs, such as online processing entities that provide services to a plurality of disparate clients.

Client device 110 may run an HTTP/HTTPS client, e.g., a browsing program, such as Microsoft's Internet Explorer or Edge browser, Mozilla's Firefox browser, Opera's browser, or a WAP-enabled browser in the case of a cell phone, tablet, notepad computer, PDA, wearable computing device, other wireless device, or the like. According to one embodiment, client device 110 and all of its components are configurable using applications, such as a browser, including computer code run using a central processing unit such as an Intel Pentium® processor or the like. However, client device 110 may instead correspond to a server configured to communicate with one or more client programs or devices, similar to a server corresponding to intelligent playback service 120 that provides one or more APIs for interaction with client device 110.

Thus, client device 110 and/or intelligent playback service 120 and all of their components might be operator configurable using application(s) including computer code to run using a central processing unit, which may include an Intel Pentium® processor or the like, and/or multiple processor units. A server for client device 110 and/or intelligent playback service 120 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring client device 110 and/or intelligent playback service 120 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Predictive Playback Model

Figure 2:
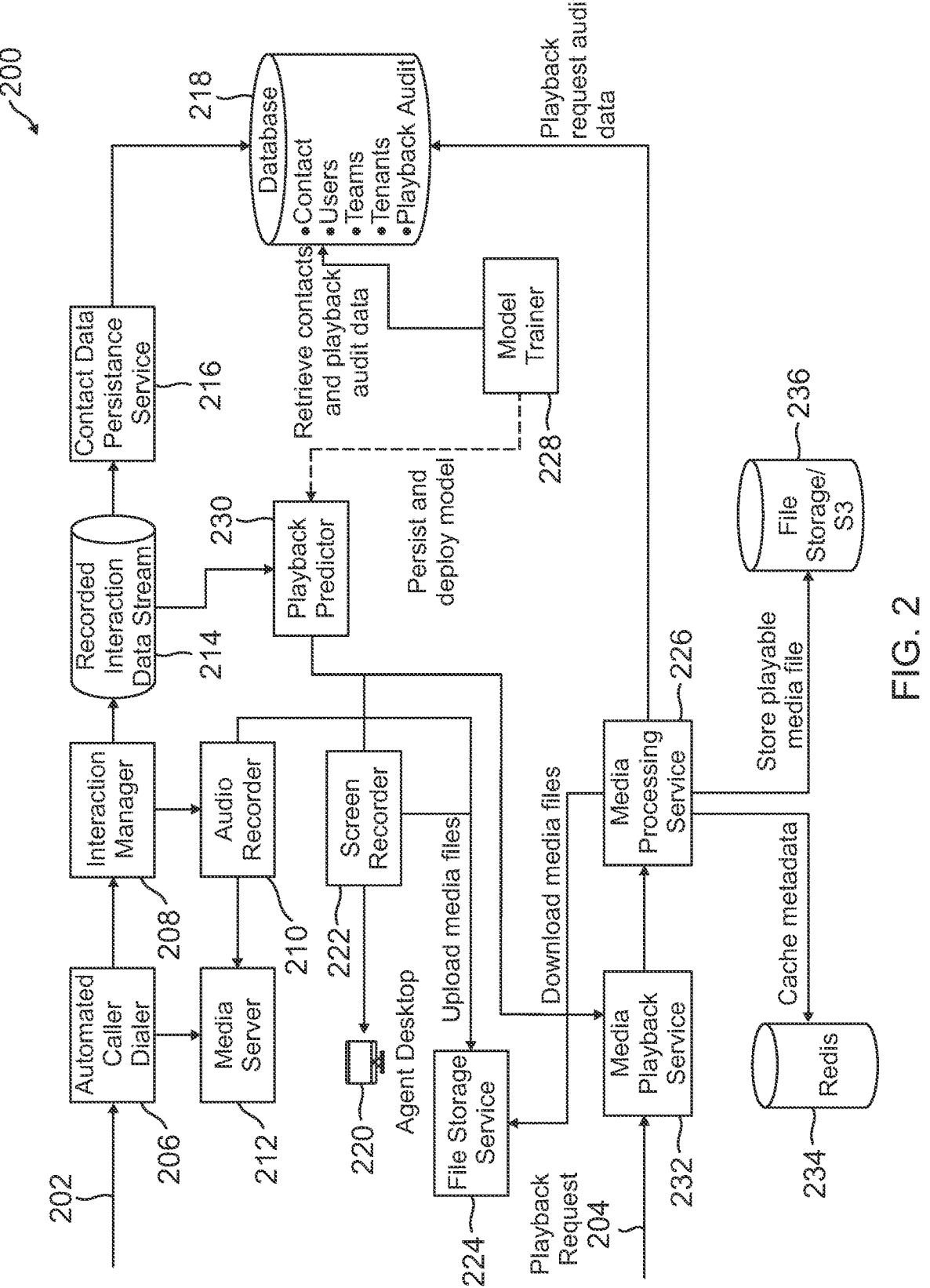
FIG. 2 is an exemplary system environment for a predictive system of playback requests using ML models for media files recording incoming interactions for according to some embodiments.

FIG. 2 is an exemplary system environment 200 for a predictive system of playback requests using ML models for media files recording incoming interactions for according to some embodiments. In this regard, system environment 200 shows handling of incoming interactions 202 for data storage including media file preparation and precaching in a predictive manner. System environment 200 further includes handling of a playback request 204 for a media file recording one of incoming interactions 202 from an interaction stream (e.g., data stream via a communication channel or the like). System environment 200 may include training of an ML model (or development of another AI based model, engine, or the like) using historical training data for past playbacks. The ML model may be trained for prediction playbacks of the media files from incoming interactions 202 so that a media file may be precached and made available for playback request 204. This may include deployment of the ML model in an online production computing environment for intelligent playback predictions, media file preparation, and precaching of prepared media files. In this regard, system environment 200 displays components that may be used for these operations, such as those for use with AI models 136 of predictive playback application 130 for intelligent playback service 120 from environment 100 of FIG. 1.

A client device, customer, and/or other end user or client may interact (e.g., using client device 110 or another computing device, phone transceiver, camera, or audio/video endpoint device) with an intelligent playback system as shown in system environment 200 (e.g., intelligent playback service 120 or another endpoint device, server, or the like for data communications). This may correspond to a communication session for audio, images, video, or other data via one or more phone calls, emails, chats or digital messages and corresponding chat sessions, SMS/MMS messages, and the like, as well as any combination thereof, for incoming interactions 202. An automated caller distributor 206 or other endpoint device or computing service may receive incoming interactions 202, which may correspond to a service that accepts incoming calls or other digital interactions and routes incoming interactions 202 to agents, chat bots, interactive voice response systems, or other human or robotic endpoints. Automated caller distributor 206 may also facilitate outbound calls from the agent to the customers and send events to interaction manager 208. Interaction manager 208 may correspond to a computing service that coordinates a recording flow according to the events from automated caller distributor, such as connections, holds, transfers, disconnect, etc. Interaction manager 208 may also generate interaction metadata packets, which are sent to recorded interaction data stream 214 after the corresponding one of incoming interactions 202 is complete (e.g., on disconnect or other termination), and may also coordinate recording audio, video, screen (e.g., computing screen operations, windows, user inputs, etc.), and the like.

For example, interaction manager 208 may coordinate with an audio recorder 210 (as well as any video or other image data recorders including screen recorders). Audio recorder 210 may correspond to a computing service responsible for recording of audio sent over Session Initiation Protocol (SIP)/Web Real-Time Communication (WebRTC) protocols. The final recorded media file may be uploaded to a scalable distributed storage device using a file storage service 224. Audio recorded in small parts may be due to multiple reasons including a hold request and corresponding resume. For example, when a call is put on hold, the recording may be paused or stopped to prevent increasing the media size. Further, a change of participants during conferencing and transfer may cause different recording parts due to a change in a source of an audio stream. Automated caller distributor 206 and/or audio recorder 210 may also interact with a media server 212, which may correspond to the media streaming server for audio of the telephony data or other audio data.

During incoming interactions, screen recorder 222 may be utilized for recording screen capture from an agent desktop. There may be a screen recording for each agent participating in the call from incoming interactions 202, where screen recordings are stored separately than the audio due to differences in the retention period applicable to each type of recording. Screen recorder 222 may be responsible for performing transcoding of the video media and converting into H264 or other video format when archiving. The data from incoming interactions 202 may be loaded and/or stored to file storage service 224, which may correspond to a service used to upload and download the recorded audio, video, and/or screen media files to and from the storage location. The files loaded to file storage 224 may correspond to the media parts and not the final playable media file, because the final playable media file may include audio, video, screen recordings, or any combination thereof. Further, the final playable media file may be processed into an MP4 or other playback format having all the relevant parts stitched together so that the playback is in the right sequence and order with any gaps filled with silences to facilitate a continuous flow. The final recorded media file may be uploaded to scalable distributed storage device using file storage service 224.

Recorded interaction data stream 214 may correspond to a data streaming component (e.g., a data streamer), such as a Kafka stream that streams data for consumers or other users to consume. In this regard, recorded interaction data stream 214 may interact with a contact data persistence service 216 that may be a computing service for reading interaction data streams and persisting the data into a database 218 including contacts and corresponding metadata for the interaction stream. A contact may correspond to one or more entities that represents a conversation of an agent with a customer or other similar interaction from incoming interactions 202. Thus, database 218 may correspond to a central data warehouse where the applications of the call or contact center bring in and store data. This may include metadata, such as user, teams, tenants, and the like. Audit data related to different applications and playbacks may also be stored in database 218, such as if a playback is requested, when after recording, how often, rate or occurrence of playback requests (e.g., per user, entity, tenant, or the like), and/or other relevant metadata.

For example, metadata may include participants to the recording (including identifiers, names, device identifiers or fingerprints, user biometrics, etc.), participant groups or organizations, time, length, audio data (e.g., pauses, voices, endpoint speaking or providing audio at different time points, etc.), video data (e.g., standard definition (SD), high definition (HD), full-HD (FHD), ultra-HD (UHD), or the like), screen data and/or parameters (e.g., resolution), and the like. Audit data may include amount of media file playbacks, when accessed, number of different playbacks and/or requesters, requester of playbacks, and the like. For example, metadata may be associated with model features for a trained ML model and may correspond to a tenant identifier, a team identifier, an agent identifier, a skill identifier, a contact end reason of the interaction, an active duration of the interaction, a contact duration of the interaction, a contact type, a channel of the interaction stream, a direction of the interaction stream, or a client tenant identifier for the interaction stream.

For training data purposes, metadata for interaction streams and/or corresponding media files may include representative values such as a real number for processing. However, categorical data may correspond to one or more variables that may have different possible values, which may be fixed and where the values are assigned within a category based on a qualitative property. Unstructured data may correspond to data that does not have a particular data model and is not organized in a particular manner that defines the values of the data. Thus, categorical data and/or unstructured data may be required to be converted to numerical representations, such as using embeddings. Embedding may be performed by utilizing autoencoders to convert raw data into real vectors in vector space. This may include mapping the qualitative similarities in the raw data into spatial Euclidean distances in the vector space. Embedding may include word and/or phrase embeddings to define data as numerical representations, for example, where a word may be converted into a vector for comparison to other words and vectors. Once the vectorization is performed, analysis of the vectors may be utilized through numerical representations of the words as vectors. Additionally, one-hot encoding may be used to take categorical data and map the categorical data to values and numerical representations. One-hot encoding may be utilized to represent different states of a state machine, for example, by showing different decisions and resulting values.

Media processing service 226 may correspond to a computing service that takes as input, stages of a media file for an interaction stream built by a media playback service 232 and indicate to media processing service 226 which files (audio/video/screen) need to be stitched together in which order and where silent audio or blank screens may occur. Media playback service 232 may handle playback requests and perform authentication and authorization checks before continuing with the playback processing. Playback request 204 based on a contact identifier may be received by media playback service 232 after authorization checks, and a collection of stages required to stitch the parts of the interaction together from the interaction stream and stored data may be determined. Media playback service 232 may also check if the contact/interaction is already available from metadata in redis 234 corresponding to a data cache. If the contact identifier is present in redis 234, the final playable media file for this contact identifier may already be available (e.g., based on a prediction of playback and corresponding preparation and precaching of the media file in a file storage 236). If the media is already available then it is served directly; however, if not then the request is forwarded to the media processing service 226 to prepare a playable media file.

When preparing media files, silent audio or blank screens may be added to fill gaps created due to holds or loss of recording due to network issues. Media processing service 226 may utilize the open source FFmpeg tool to process media using commands or other media processing tool. The final stitched media file in MP4 format may be uploaded to file storage 236 or an Amazon Web Services S3 bucket, such as a data cache or quick-access storage including cloud storage or the like for the media file. Thereafter, a uniform resource locator (URL) to the file may be returned to media playback service 232, which in turn may have the URL returned to the end user to initiate playback. There may be a frontend application required to consume the URL and run the media file in a browser.

In order to have the files cached, a model trainer 228 may train an ML model for a playback predictor 230 that predicts playbacks and interacts with media processing service 226 for media file preparation and storage to file storage 236 with corresponding metadata stored by redis 234. Model trainer 228 trains the predictive ML model that predicts whether a call, interaction, or the like will be played or not within a certain time period or within an amount of time from recording (e.g., X time after recording). Model trainer 228 may collect the interaction information and playback audit information for interactions that have been played and those that have not from database 218. This information may be used to train an ML model for predicting occurrence of playback of a media file recording an interaction.

For example, media data and metadata may be utilized as input values and nodes to train an ML model, where nodes within the hidden layer are then determined and weights or values are applied to those nodes. Those nodes are then connected to nodes in the next hidden layer and/or output layer, where backwards propagation may also be used for retraining. One or more ML models may be trained for those features to provide an output classifier, such as a classification of whether an interaction and correspond media file recording the interaction's data stream may be played back (e.g., positive or negative, such as "will be played back" or "will not be played back," as well as a quantification or prediction confidence). ML models may include different layers, such as an input layer, one or more hidden layers, and an output layer, each having one or more nodes, however, different layers may also be utilized. For example, ML models may include as many hidden layers between an input and output layer as necessary or appropriate. Nodes in each layer may be connected to nodes in an adjacent layer. In this example, ML models receive a set of input values or features and produce one or more output values. However, different and/or more outputs may also be provided based on the training. When ML models are used, each node in the input layer may correspond to a distinct attribute or input data type derived from the training data.

In some embodiments, each of the nodes in a hidden layer, when present, generates a representation, which may include a mathematical computation (or algorithm) that produces a value based on the input values of the input nodes. The mathematical computation may include assigning different weights to each of the data values received from the input nodes. The hidden layer nodes may include one or more different algorithms and/or different weights assigned to the input data and may therefore produce a different value based on the input values. Each node in a hidden layer may be connected to the nodes in the adjacent hidden layer. The values generated by the hidden layer nodes may be used by the output layer node to produce an output value. When an ML model is used, a classification, score, or prediction may be output from the features. The ML model may be trained by using training data, including training metadata and tables, which may also be prepared by converting data to numerical representations and vectors. ML models may be separately trained using training data from data bagging, as well as tested and/or updated using data bagged sets for features, where the nodes in the hidden layer may be trained (adjusted) such that an optimal output (e.g., a classification) is produced in the output layer based on the training data.

By continuously providing different sets of training data and penalizing ML models when the output is incorrect, ML models (and specifically, the representations of the nodes in the hidden layer) may be trained (adjusted) to improve performance of the models in data classification. Adjusting ML models may include separately adjusting the weights associated with each node in the hidden layer, as well as activation functions of node importance and/or data throughput to a further node. Different models and/or algorithms, such as tree-based, NN, DNN, clustering, and the like, may be used. Playback predictor 230 then implements this model once trained and/or retrained. Playback predictor 230 uses the trained and persisted ML model and runs predictions on new contacts/interactions that arrive on recorded interaction data stream 214. If a prediction result is true, then the playback predictor 230 calls media playback service 232 to create a playable media file for caching and/or storage in file storage 236 and cache the entry for easy retrieval in redis 234.

Figure 3:
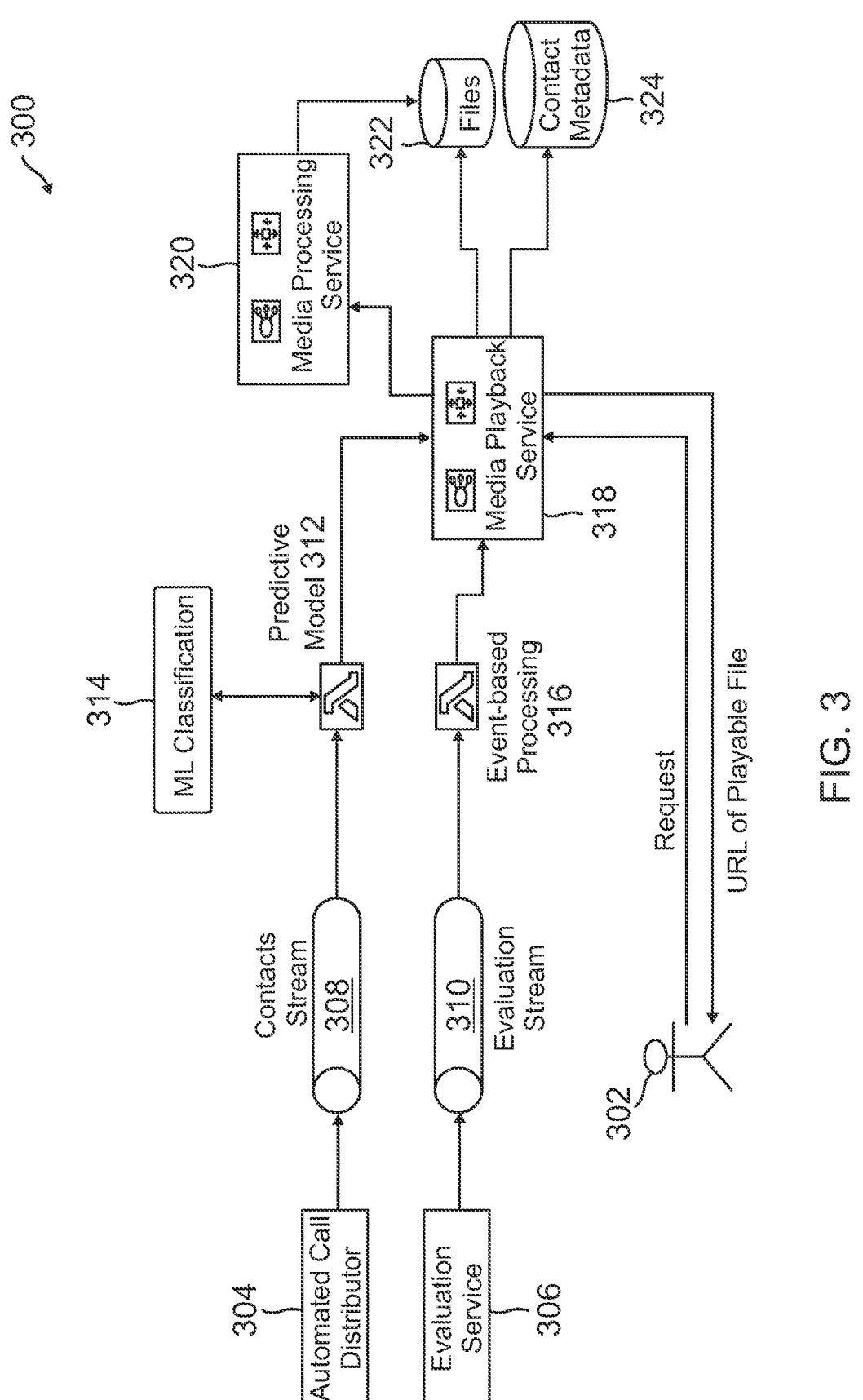
FIG. 3 is an exemplary system environment of a ML system and event-based processing system to precache media files based on predictions of playback requests according to some embodiments.

FIG. 3 is an exemplary system environment 300 of a ML system and event-based processing system to precache media files based on predictions of playback requests according to some embodiments. In this regard, system environment 300 shows predictive caching with event-based caching for media files of interactions for playback to a requester 302 from a cache or other data storage after preparation. An automated caller distributor 304 may provide interaction data in a contacts stream 308 for predictive caching, while an evaluation service 306 may provide the corresponding evaluation stream 310 for caching. In this regard, system environment 300 displays components that may be used for these operations, such as those for use with AI models 136 of predictive playback application 130 for intelligent playback service 120 from environment 100 of FIG. 1.

In this regard, two different types of predictive caching may be performed by a predictive caching system of media files prior to requested playbacks. For example, with automated caller distributor 304, predictive model 312 may be invoked using data from contacts stream 308, such as data and metadata from incoming interactions and their data streams. Predictive model 312 may correspond to a trained ML model to provide an ML classification 314 as output, such as whether an incoming interaction's data stream and recorded media files of that stream may be played back at a future time, including within a certain near future time that justifies media file preparation and precaching. Predictive model 312 may then interact with a media playback service 318 for media file creation and caching. Media playback service 318 may correspond to media playback service 232 from system environment 200 of FIG. 2, where predictive model 312 similarly feeds playback predictions and requests for preparation and precaching of media files and metadata based on interactions likely to be played back by contacts. Media playback service 318 may then interact with a media processing service 320 in order to perform operations for media file preparation, such as executing API calls to one or more APIs, corresponding services, and/or databases (e.g., as read calls/requests for data), stitching the media file together using parts of the media file and a media processing library, and uploading of the media file. Media processing service 320 may correspond generally to media processing service 226 as discussed with regard to system environment 200 of FIG. 2, and therefore may include similar functions and/or features. The media file may be uploaded to files 322 where contact metadata 324 caches metadata for the media file. Files 322 and contact metadata 324 may correspond to local and/or quick-access storages for reads and/or writes of data, for example, for fast access during playback requests by requester 302 to media playback service 318.

Conversely, event-based caching may be used to perform an evaluation a number of segments, where consideration of multiple playbacks by an evaluator, agent, or other contact may be identified. This may be based on particular events, such as a start of an evaluation or calibration period. In this regard, rules may be established with an event-based processing 316 to identify certain interactions that are likely to be played back based on a particular occurring event. Event-based processing 316 may receive evaluation stream 310 from evaluation service 306, and similarly then interact with media playback service 318. Media playback service 318 may then invoke media processing service 320 for preparation of the media files, caching and/or storage in files 322, and caching of metadata in contact metadata 324 for playback requests from requester 302.

Figure 4B:
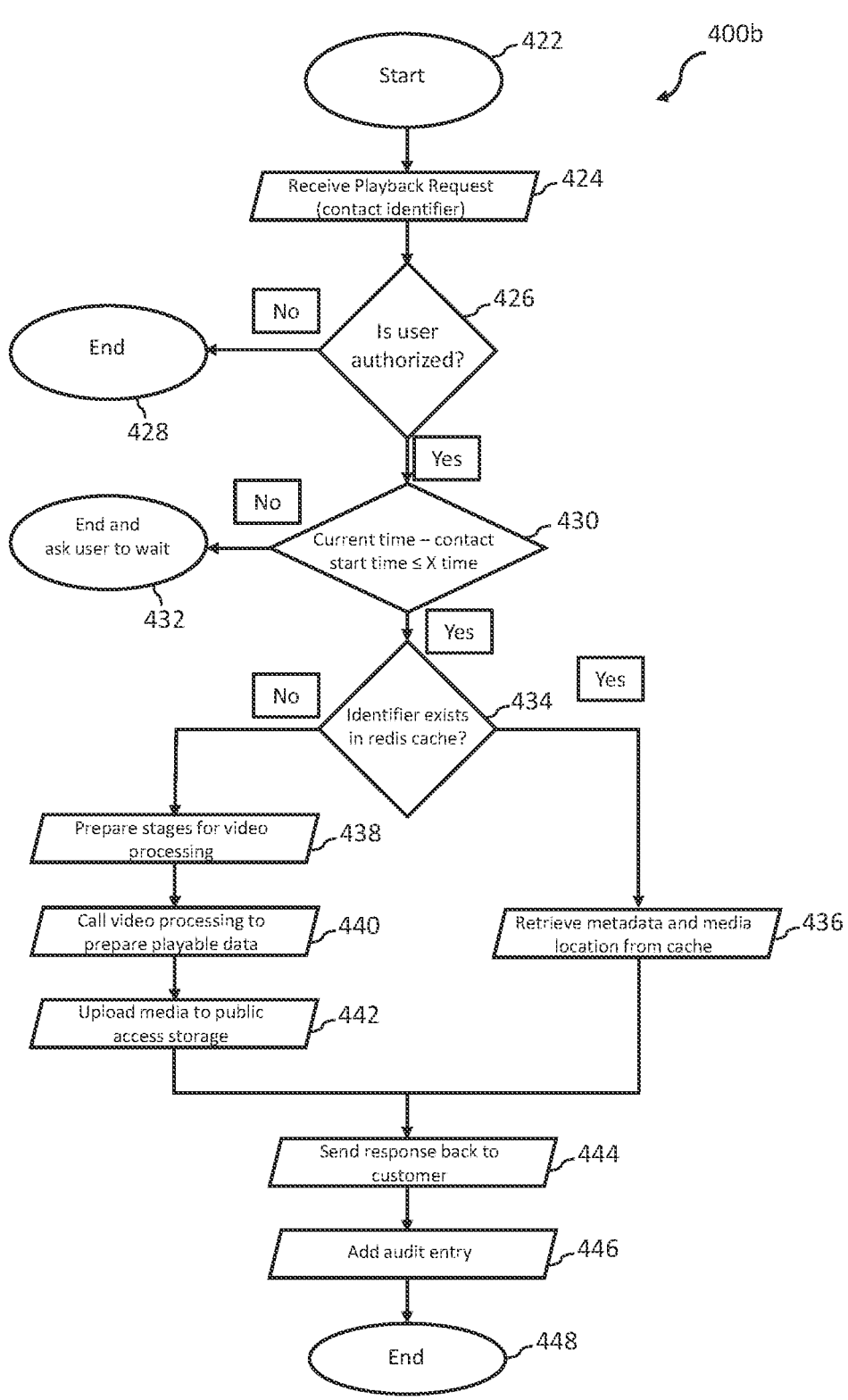

FIGS. 4A-4B are simplified diagrams of exemplary flowcharts 400a and 400b for training and deploying ML models for predictive playback services of media files according to some embodiments. Note that one or more steps, processes, and methods described herein of flowcharts 400*a* and 400*b* may be omitted, performed in a different sequence, or combined as desired or appropriate based on the guidance provided herein. Flowchart 400*a* of FIG. 4A includes operations for training an ML system for prediction of media files, while flowchart 400*b* includes operations for identifying cached media files or media files requiring preparation for responses to playback requests, as discussed in reference to FIG. 1-3. One or more of steps 402-416 of flowchart 400*a* and/or one or more of steps 422-448 of flowchart 400*b* may be implemented, at least in part, in the form of executable code stored on non-transitory, tangible, machine-readable media that when run by one or more processors may cause the one or more processors to perform one or more of steps 402-416 and/or one or more of steps 422-448. In some embodiments, flowcharts 400*a* and 400*b* can be performed by one or more computing devices discussed in environment 100 of FIG. 1.

Initially, a cloud computing environment and/or system, service provider, and/or customer relationship management (CRM) system may train an ML model for predicting playbacks of media files by contacts and/or other tenants or customers. There may be multiple services utilized during model training. At step 402 of flowchart 400*a*, the data for training is loaded from a database. The loaded data may include data from a contact table that is pulled for a selected time period for which the model is to be trained. Additionally, audit data of playbacks done in the same time period may also be pulled. The contact table data and the audit data may be merged in order to determine which contacts and corresponding interaction streams (as media files) were played and which contacts and interaction streams were not played. This allows for generation of a training data set, which is associated with ML model features that may correspond to attributes, properties, or characteristics within the data set that have been measured and/or recorded as data points in data records for different interactions. These features may correspond to dimensionalities and/or characteristics that may be used to generate a vector or other representation (e.g., a vector of n-dimensions).

For example, during training, features considered for model inclusion may be determined, such as those features available to an ML platform's decision processes at a time of execution (e.g., available to an ML model trainer and/or decision platform of a service provider). This may include a variety of features representing, such as by numerical, alphanumerical, and/or symbol representation (including those in matrices, vectors, etc.), a tenant identifier, a team identifier, an agent identifier, a skill identifier, a contact end reason of the interaction, an active duration of the interaction, a contact duration of the interaction, a contact type, a channel of the interaction stream, a direction of the interaction stream, a client tenant identifier for the interaction stream, and the like. Model training may be performed using features determined from feature engineering. Feature engineering may be performed by using domain knowledge to extract features from raw data (e.g., variables) in the training data set. For example, data features may be transformed from specific variables and features based on business logic and/or selected by a data scientist or feature engineer. During feature engineering, features may be identified and/or selected based on historically aggregated data for observations.

Prior to ML model training, the data may be cleansed and preprocessed for possible data issues and prior to fitting to the ML model and corresponding engineered and/or selected features. Steps 404, 406, and 408 include operations for data preprocessing. At step 404, unwanted columns are removed from the data. At step 406, null or not a number (NaN) values are replaced with zero (0). At step 408, if any column contains a character value, normalization is applied to convert that character value to a number. For example, data preprocessing may include steps that may be required during training and/or data analysis, which may include data cleaning, sampling, normalizing, determining intersecting columns between data sets, and feature engineering. In this regard, contact tables and data with audit data for prior interaction may be processed to output tables having rows and columns, where each row includes a data record for an interaction and/or contact, and the columns correspond to different features or other data parameters for the rows' data records. Data preprocessing may be performed to clean the merged data in table form by removing unwanted columns at step 404. Thereafter, null or NaN values in the remaining data table are replaced with zero at step 406, and finally techniques to convert character values to numbers may be applied during normalization at step 408. Step 408 may include converting characters, words, or phrases to numerical values or vectors through embedding, encoding (e.g., one-hot encoding), and the like. Data enrichment may occur during preprocessing of data sets to obtain additional information in the training and/or testing data sets.

Thereafter, a train and test flow may be used for the ML model training, or other NN and/or AI-based model or engine training and/or development. The ML model may be trained on the merged and preprocessed data from the contact table(s) and/or audit data. At step 410, the model is trained where 70% of the training data is used for predictions (e.g., during ML model training) and 30% is used to calculate the accuracy of the model (e.g., during testing). During ML model training and testing, the data set may be split into a training data set and a testing data set, and additional sampling and/or data bagging may occur. Data bagging may occur by taking a relative sample size of all features for the ML model and training/testing multiple ML models, each configured with the corresponding features. Thereafter, a combination of the different ML models or a best performing model may be selected for use, deployment, and decision-making in a production computing environment performing sentiment analysis of social media posts. Sampling may also or instead be performed to reduce system bias with uneven data sets. During training and testing, the data points in each data set for training and testing may be excluded for each other to check accuracies and precisions by the ML model. The data points in the training data set may chronologically occur before the data points in each of the test data sets.

After training, local tests are run by checking the accuracy of the model on a test data set. At step 412, it is determined whether the model accuracy meets or exceeds 80%. If so, flowchart 400*a* proceeds to step 414 and at step 414, the algorithm and corresponding ML model for execution and deployment may be used for further predictions. This may include deployment in a production computing environment, such as for predictive playbacks (e.g., with playback predictor 230 in system environment 200 of FIG. 2). The results may be verified, and the ML model may be persisted and deployed to a playback predictor service. However, if the prediction accuracy does not meet or exceed 80%, flowchart 400*a* proceeds to step 416 where a different prediction algorithm is tried and tested. Once an ML or other model has been deployed, the playback predictor service may proceed to flowchart 400*b* of FIG. 4B for predicting playbacks to prepare and precache media files for the playback predictions.

Thus, during playback prediction operations, at step 422 of flowchart 400*b*, a recording of a call or other interaction is initiated by an ACD system or other audio, video, or media data recording system, which may include audio/video/screen recorders that may start recording the corresponding media. For example, once the customer or other contact in the interaction ends the call or interaction, (i) the media files for the interaction stream, (ii) the data for that stream may be archived to a file storage system, and (iii) the metadata of the call are forwarded to a data streaming service, such as a recorded data interaction service. This data contains the details of the contacts and the interaction, include the agent, the customer, date/time, communication channel, duration, holds or pauses, etc. A contact data persistence service may read the data stream and persists this data to a database.

When new contact information is sent over the interaction data stream, the information may be received by the playback predictor service. This service includes the ML model from flowchart 400*a* that was trained by the model training service and deployed in this service. The playback predictor service may utilize the received contact information and run a prediction on a potential for a playback request of the interaction and corresponding media file using the trained model and the received contact. If the prediction output is true (e.g., an output indicating playback is predicted), that prediction indicates that there is a high probability of the interaction being played and hence the playback predictor may execute a call to the media processing service to prepare the final playable media file with audio and upload that file to a data cache that maintains the file as ready for when the playback request arrives. Before the playback and caching of the media file, the new media file may be created using the interaction stream. In this regard, a media processing service and a playback predictor service may interact and exchange API calls to prepare the media file when predicted for a potential future playback. Once prepared, that file may be cached and utilized to respond to playback requests as shown in flowchart 400*b*. However, if no file is cached, flowchart 400*b* may proceed to prepare the media file on the fly.

Thus, after step 422, flowchart 400*b* proceeds to step 424 where a playback request is received. This request may include a contact identifier, such as an identifier, name, login, or other identification data for a contact in the interaction or associated with the interaction (e.g., given authorization for review or playback of the interaction from the media file). At step 426, it is determined if the user is authorized, such as based on their login, permissions, authorization credential(s), contact identifier, or the like. If not, flowchart 400*b* ends at step 428.

Further, if a request comes in prior to processing of the media data (e.g., right after the interaction between contacts), the prediction service and/or media processing service may check that the current time is greater than and/or exceeds a threshold amount of time since the interaction, such as 5 minutes, in order to provide for prediction and caching, as well as quality and analytic issues with compliance requirements. Thus, at step 430, it is determined if the current time minus the contact start time is less than X amount of time (e.g., 5 minutes). If not exceeded, the service(s) may request that the requestor wait an amount of time at step 432, such as the length required or set by an SLA for media file return for a playback request.

In order to prevent multiple caching of data, the data cache may be checked to determine whether the media file is ready for the contact ID requesting the media file and if so, a URL may be provided for that media file. If not available in the cache, the media file may be designated for generation and/or caching if identified as being potentially played back by a contact. This may occur if a prediction did not designate the media file for preparation and precaching and/or if an amount of time expired since the caching of a predicted playback and the media file was removed or deleted from the cache. At step 434, it is determined if the identifier exists in the redis cache. If so, at step 436, metadata and a media location of the media file is retrieved from the cache. A response is then sent back to the customer at step 444. This causes an audit entry to be added at step 446, which may correspond to an entry in audit data that a media file was played back, by whom, and when (or other circumstances and parameters of the playback). When requested for playback, the media playback service may add an audit entry for the playback request that includes an audit ID, an entity name, an entity ID, and activity date, an activity type, and a user ID (e.g., the requesting user for the playback of the media file). The audit data may allow for further training, and at step 448, flowchart 400*b* ends.

However, if at step 434, no identifier exists in the redis cache for the contact identifier from the playback request and/or for the media file, flowchart 400*b* proceeds to steps 438, 440, and 442 to prepare a media file for the interaction identified by the contact identifier or other information in the playback request. This may occur on the fly and therefore introduce some delay in providing the media file as the media file has not been precached or has been removed from the data cache prior to the playback request from step 424. Preparation of the media file at steps 438, 440, and 442 may proceed similarly for preparing and precaching media files for playbacks that have been predicted. For example, a playback predictor service may utilize steps 438-442 with a media file preparation service to prepare a media file predictively, which is then cached.

In order to generate the media file, stages may be used in the media processing to stitch together a final playable media. At step 438, stages for video processing are prepared, which may include those for API calls, data retrieval, data ordering and stitching, insertion of additional data or the like to account for certain occurrences during the interaction. In this regard, at step 440 a media processing service API is called to prepare playable media. The media processing service may analyze the stages and download the parts of the media file that are required. Thereafter the media processing service may stitch together (e.g., combine in an ordered combination and/or sequential or structured order based on the parts) using a media processing library, such as FFMpeg. This may include adding silences and/or blank screens for missing media (e.g., due to issues, holds during calls, drop offs of contacts, etc.). At step 442, the media processing service uploads the final playable media file to a temporary upload location, such as a data cache. In some embodiments, the data cache may reside in a cloud computing environment and the location may be temporary as the file may be uploaded for a limited time period and removed or deleted after expiration of the time period. The URL of the temporary location in the data cache may then be returned to the media playback service and/or the playback predictor service in order to be responsive to playback requests to playback the media file and/or provide the URL to the contact. The entry of the created media file is therefore added to the data cache and maintained for a time period, where the entry includes a key—contact identifier, an object containing the file location, and stages information, which allows identification and authorization of playback.

Thus, during a media playback, a playback request for an interaction, such as a call, video chat or conference, or other audio and/or video feeds and/or streams may be received and, when predictively cached, a media file may be returned faster and more efficiently. The authenticity of the user or contact requesting the playback may be validated including an authorization that the contact has the required permissions to access the media. If so, the media file may be loaded from the data cache in a faster and more efficient manner to the device of the contact, which may have a decreased processing load and/or playback wait times, which provide improved and faster response times to media playback requests. As such, the contact may view and/or play the media file, such as in a web player or local media player when accessed from the data cache to the computing device of the contact.

FIG. 5 is a simplified diagram of an exemplary flowchart 500 for improving media playback response time in call centers using ML models trained to predict media playback requests according to some embodiments. Note that one or more steps, processes, and methods described herein of flowchart 500 may be omitted, performed in a different sequence, or combined as desired or appropriate based on the guidance provided herein. Flowchart 500 of FIG. 5 includes operations for an ML system when predicting whether media files will be played back in order to prepare and precache such media files, as discussed in reference to FIG. 1-4B. One or more of steps 502-510 of flowchart 500 may be implemented, at least in part, in the form of executable code stored on non-transitory, tangible, machine-readable media that when run by one or more processors may cause the one or more processors to perform one or more of steps 502-510. In some embodiments, flowchart 500 can be performed by one or more computing devices discussed in environment 100 of FIG. 1.

At step 502 of flowchart 500, metadata for an interaction stream is received after recording a media file of an interaction. The metadata may be received for an interaction between contacts, such as different users involved in a communication session. One or more of the users may be associated with a service provider or other entity, such as an agent of a company, call center, or the like. In this regard, one or more other users may correspond to a customer or other user interacting with the agent, however, other users may also converse during interactions (e.g., business associates, coworkers, etc.). In some embodiments, the service provider may include and/or correspond to a media service provider that provides media services including recording, storing, and providing media content from these interactions. For example, the service provider may record, for storage and later use, interactions including phone calls, video teleconferences, video streams and recordings, media sharing of user content, or any combination thereof. The service provider may prepare media files, for example, by transcoding, preparing, stitching different data files and/or recordings together, formatting into a particular data format, or otherwise making available for playback through a media player.

At step 504, contacts in the interaction that are recorded in the media file are determined based on the metadata. The metadata may include the data associated with generating, storing, and/or playing media files, including the contacts of the corresponding interaction and the data, activity, and parameters of the interaction. Thus, metadata may be parsed and contact identifiers, names, or other identification data may be used to determine the contacts involved in the interaction. The metadata may be provided with the interaction stream's data and/or recorded files prior to preparation in a final playable media format and file.

At step 506, using an ML model trained to predict media playback requests, a prediction associated with whether the media file may be played back by one or more of the contacts may be determined. The ML model may be trained using training data associated with past playbacks by different contacts and at different times, locations, or contexts. For example, the ML model may be trained to predict media playback requests based on contact data including a contact table of contacts for interactions during a time period, as well as audit data of past media playbacks during the selected time period. The audit data may indicate whether media files have been played back by certain contacts, as well as time and/or location of playback, playback requesting device, interacting contacts, and other metadata for the parameters of requested playbacks. Further, those media files and/or interactions that are not played back may also be identified and annotated for the training data. Thus, the ML model, once trained, may be used to predict, based on the metadata including identified contacts and parameters of the interaction, whether a media file recording that interaction may be requested for playback after the interaction (as well as within a limited time period after the interaction, which may be set for temporary caching).

At step 508, based on the prediction, a playback of the media file at a future time by the contact(s) may be predicted. The playback may be predicted if an output score or computation meets or exceeds a threshold score or likelihood that the media file will be requested for playback by one or more of the contacts or another entity. Thus, the prediction may correspond to a predictive classification by the ML model of the likelihood of playback and therefore indicate whether a media file of the corresponding interaction should be prepared and precached for the playback request(s). At step 510, the media file is prepared for the playback and cached in a data cache for a period of time. The period of time may be an expirable amount of time after the interaction and/or preparation of the media file, after which, the media file may be removed, deleted, or otherwise erased from the data cache to allow for storage of other data and/or files (e.g., to not overburden or waste memory and data storage resources). This may be set by an administrator and/or based on past media file playback occurrences (e.g., a statistical model of when, after an interaction, media files are played back). The media file may be prepared by stitching together relevant data portions and files, filling any required additional data, and formatting into a data format. The final media file may be stored to a local, cloud-based, and/or quick-access data cache or other storage, along with metadata identifying the media file, for fast and seamless media file provision to requesting devices.

As discussed above and further emphasized here, FIGS. 1, 2, 3, 4, 5, and 6 are merely examples of intelligent playback service 120 and corresponding methods for predictive playback of media files, which examples should not be used to unduly limit the scope of the claims. One of ordinary skill in the art would recognize many variations, alternatives, and modifications.

Figure 6:
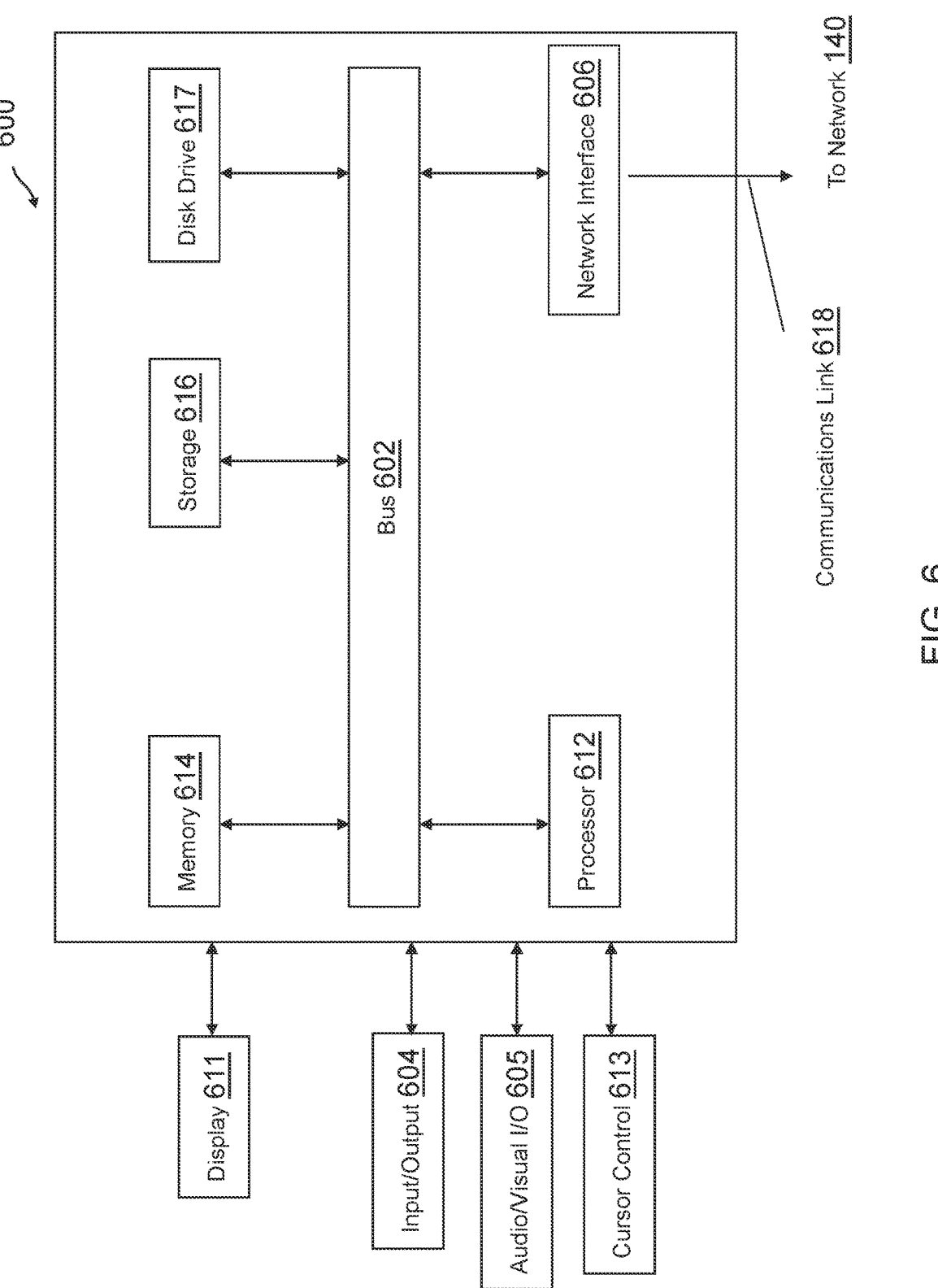
FIG. 6 is a simplified diagram of a computing device according to some embodiments.

FIG. 6 is a block diagram of a computer system 600 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio/visual input/output component 605 may also be included to allow a user to use voice for inputting information by converting audio signals. Audio/visual I/O component 605 may allow the user to hear audio, and well as input and/or output video. A transceiver or network interface 606 transmits and receives signals between computer system 600 and other devices, such as another communication device, service device, or a service provider server via network 140. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A machine learning (ML) system configured to predict media playback requests of media files to decrease response times to the media playback requests, the ML system comprising a processor and a computer readable medium operably coupled thereto, the computer readable medium comprising a plurality of instructions stored in association therewith that are accessible to, and executable by, the processor, to perform predictive caching operations which comprise:

training an ML model to predict the media playback requests by the tenant of the media files for predictive caching of the media files on behalf of the tenant, wherein the training comprises:

retrieving contact table data for a selected time period to train the ML model, retrieving the prior playback audit data of past media playbacks during the selected time period, merging the contact table data and the prior playback audit data into training data based on each contact in the contact table data and corresponding ones of the past media playbacks in the prior playback audit data, cleaning the training data, preprocessing the training data, training the ML model based on the training data and a plurality of model features, testing the ML model using local tests corresponding to the plurality of model features, and verifying results of the testing, receiving metadata from an interaction stream after recording a media file of an interaction between a plurality of contacts for a first playback of the media file, wherein the plurality of contacts includes an agent of a tenant associated with the ML system, and wherein the tenant comprises a business entity having a plurality of users including at least one of the plurality of contacts;

determining the plurality of contacts from the metadata for the media file, wherein the plurality of contacts are permitted access to the media file or can request the first playback;

accessing the ML model;

determining, using the ML model and the plurality of model features for the ML model including at least one model feature associated with prior playback audit data of the tenant, a first prediction of a likelihood that the tenant will request that the media file be made available to the plurality of contacts for the first playback, wherein the first prediction is determined for the tenant based on the media file and prior playback audit data associated with the tenant independently from being associated with a single contact of the plurality of contacts;

determining that the one or more of the plurality of contacts of the tenant can utilize a playback application on a server corresponding to the ML system for the first playback;

predicting the first playback of the media file will be requested from the playback application based on the first prediction, wherein the first playback comprises a media player request for the media file on a computing device of one of the plurality of contacts from the playback application on the server, and wherein the first playback is predicted for the tenant independent of playback predictions for the plurality of contacts individually being determined for the first playback;

accessing a data cache of the server corresponding to the ML system, wherein the data cache provides data to a plurality of computing device of the tenant from the server; and caching the media file in the data cache of the server for a time period based on the predicting.

2. The ML system of claim 1, wherein the predictive caching operations further comprise:

receiving, from the one of the plurality of contacts, the media player request for the first playback of the media file during the time period;

loading the media file from the data cache; and transmitting the media file from the playback application on the server to an application on the computing device of the one of the plurality of contacts.

3. The ML system of claim 2, wherein, before loading the media file, the predictive caching operations further comprise:

authenticating the one of the plurality of contacts for access to the media file; and determining that an amount of time has elapsed since an arrival of the metadata on the interaction stream for the interaction stream that is required to generate the media file.

4. The ML system of claim 1, wherein the predictive caching operations further comprise:

determining that the time period for caching the media file has expired; and removing the media file from the data cache based on the time period having expired.

5. The ML system of claim 1, wherein a first percentage of the training data is used to train the ML model for predictive outputs, and wherein a second percentage of the training data is used to train the ML model for accuracy of the predictive outputs.

6. The ML system of claim 1, wherein the plurality of model features comprises at least one of a tenant identifier, a team identifier, an agent identifier, a skill identifier, a contact end reason of the interaction, an active duration of the interaction, a contact duration of the interaction, a contact type, a channel of the interaction, a direction of the interaction, or information sent over the interaction stream.

7. The ML system of claim 1, wherein, before receiving the media file, the predictive caching operations further comprise:

executing a call to an application programming interface (API) of a media processing service, wherein the media processing service downloads parts of the media file, stitches the media file together using the parts and a media processing library, and uploads the media file with the metadata to a temporary upload location of the data cache, wherein receiving the media file comprises receiving a URL of the temporary upload location for the media file in a final playable format responsive to the call to the API.

8. The ML system of claim 1, wherein the first prediction is associated with an output indicating true for the one of the plurality of contacts to request the first playback, and wherein, if a second prediction for a second playback by the ML model is associated with an output indicating false for the one of the plurality of contacts to request the first playback, a corresponding media file for the second prediction is not cached.

9. A method to predict media playback requests of media files by a machine learning (ML) system to decrease response times to the media playback requests, the method comprising:

training an ML model to predict the media playback requests by the tenant of the media files for predictive caching of the media files on behalf of the tenant, wherein the training comprises:

retrieving contact table data for a selected time period to train the ML model, retrieving the prior playback audit data of past media playbacks during the selected time period, merging the contact table data and the prior playback audit data into training data based on each contact in the contact table data and corresponding ones of the past media playbacks in the prior playback audit data, cleaning the training data, preprocessing the training data, training the ML model based on the training data and a plurality of model features, testing the ML model using local tests corresponding to the plurality of model features, and verifying results of the testing, receiving metadata from an interaction stream after recording a media file of an interaction between a plurality of contacts for a first playback of the media file, wherein the plurality of contacts includes an agent of a tenant associated with the ML system, and wherein the tenant comprises a business entity having a plurality of users including at least one of the plurality of contacts;

determining the plurality of contacts from the metadata for the media file, wherein the plurality of contacts are permitted access to the media file or can request the first playback;

accessing the ML model;

determining, using the ML model and the plurality of model features for the ML model including at least one model feature associated with prior playback audit data of the tenant, a first prediction of a likelihood that the tenant will request that the media file be made available to the plurality of contacts for the first playback, wherein the first prediction is determined for the tenant based on the media file and prior playback audit data associated with the tenant independently from being associated with a single contact of the plurality of contacts;

predicting the first playback of the media file will be requested from the playback application based on the first prediction, wherein the first playback comprises a media player request for the media file on a computing device of one of the plurality of contacts from the playback application on the server, and wherein the first playback is predicted for the tenant independent of playback predictions for the plurality of contacts individually being determined for the first playback;

accessing a data cache of the server corresponding to the ML system, wherein the data cache provides data to a plurality of computing device of the tenant from the server; and caching the media file in the data cache of the server for a time period based on the predicting.

10. The method of claim 9, further comprising:

receiving, from the one of the plurality of contacts, the media player request for the first playback of the media file during the time period;

loading the media file from the data cache; and transmitting the media file from the playback application on the server to an application on the computing device of the one of the plurality of contacts.

11. The method of claim 10, wherein, before loading the media file, the method further comprises:

authenticating the one of the plurality of contacts for access to the media file; and determining that an amount of time has elapsed since an arrival of the metadata on the interaction stream for the interaction stream that is required to generate the media file.

12. The method of claim 9, further comprising:

determining that the time period for caching the media file has expired; and removing the media file from the data cache based on the time period having expired.

13. The method of claim 9, wherein a first percentage of the training data is used to train the ML model for predictive outputs, and wherein a second percentage of the training data is used to train the ML model for accuracy of the predictive outputs.

14. The method of claim 9, wherein the plurality of model features comprises at least one of a tenant identifier, a team identifier, an agent identifier, a skill identifier, a contact end reason of the interaction, an active duration of the interaction, a contact duration of the interaction, a contact type, a channel of the interaction, a direction of the interaction, or information sent over the interaction stream.

15. The method of claim 9, wherein, before receiving the media file, the method comprises:

executing a call to an application programming interface (API) of a media processing service, wherein the media processing service downloads parts of the media file, stitches the media file together using the parts and a media processing library, and uploads the media file with the metadata to a temporary upload location of the data cache, wherein receiving the media file comprises receiving a URL of the temporary upload location for the media file in a final playable format responsive to the call to the API.

16. The method of claim 9, wherein the first prediction is associated with an output indicating true for the one of the plurality of contacts to request the first playback, and wherein, if a second prediction for a second playback by the ML model is associated with an output indicating false for the one of the plurality of contacts to request the first playback, a corresponding media file for the second prediction is not cached.

17. A non-transitory computer-readable medium having stored thereon computer-readable instructions executable to predict media playback requests of media files by a machine learning (ML) system to decrease response times to the media playback requests, the computer-readable instructions executable to perform predictive caching operations which comprises:

training an ML model to predict the media playback requests by the tenant of the media files for predictive caching of the media files on behalf of the tenant, wherein the training comprises:

retrieving contact table data for a selected time period to train the ML model, retrieving the prior playback audit data of past media playbacks during the selected time period, merging the contact table data and the prior playback audit data into training data based on each contact in the contact table data and corresponding ones of the past media playbacks in the prior playback audit data, cleaning the training data, preprocessing the training data, training the ML model based on the training data and a plurality of model features, testing the ML model using local tests corresponding to the plurality of model features, and verifying results of the testing, receiving metadata from an interaction stream after recording a media file of an interaction between a plurality of contacts for a first playback of the media file, wherein the plurality of contacts includes an agent of a tenant associated with the ML system, and wherein the tenant comprises a business entity having a plurality of users including at least one of the plurality of contacts;

determining the plurality of contacts from the metadata for the media file, wherein the plurality of contacts are permitted access to the media file or can request the first playback;

accessing the ML model;

determining, using the ML model and the plurality of model features for the ML model including at least one model feature associated with prior playback audit data of the tenant, a first prediction of a likelihood that the tenant will request that the media file be made available to the plurality of contacts for the first playback, wherein the first prediction is determined for the tenant based on the media file and prior playback audit data associated with the tenant independently from being associated with a single contact of the plurality of contacts determining that the one or more of the plurality of contacts of the tenant can utilize a playback application on a server corresponding to the ML system for the first playback;

predicting the first playback of the media file will be requested from the playback application based on the first prediction, wherein the first playback comprises a media player request for the media file on a computing device of one of the plurality of contacts from the playback application on the server;

accessing a data cache of the server corresponding to the ML system, wherein the data cache provides data to a plurality of computing device of the tenant from the server; and caching the media file in the data cache of the server for a time period based on the predicting.

18. The non-transitory computer-readable medium of claim 17, wherein the predictive caching operations further comprise:

receiving, from the one of the plurality of contacts, the media player request for the first playback of the media file during the time period;

loading the media file from the data cache; and transmitting the media file from the playback application on the server to an application on the computing device of the one of the plurality of contacts.

* * * * *